United States Patent [19]

Birgel et al.

[11] 4,421,967
[45] Dec. 20, 1983

[54] WINDMILL DRIVEN EDDY CURRENT HEATER

[75] Inventors: Warren J. Birgel, Golden Valley; Chester S. Hajec, Roseville, both of Minn.

[73] Assignee: VS Systems, Inc., St. Paul, Minn.

[21] Appl. No.: 342,602

[22] Filed: Jan. 25, 1982

Related U.S. Application Data

[63] Continuation of Ser. No. 170,736, Jul. 21, 1980, abandoned.

[51] Int. Cl.³ .............................. H05B 6/06; F03D 9/00
[52] U.S. Cl. ......................... 219/10.51; 219/10.49 R; 219/10.65; 219/10.75; 290/44; 290/55; 322/35; 322/33
[58] Field of Search ............... 219/10.49 R, 10.51, 219/10.65, 10.57, 10.75, 10.77; 290/44, 55; 322/35, 33, 34

[56] References Cited

U.S. PATENT DOCUMENTS

| | | | |
|---|---|---|---|
| 2,088,617 | 8/1937 | Sola | 322/33 |
| 2,339,636 | 1/1944 | Hall | 322/33 |
| 2,549,362 | 4/1951 | Bessiere et al. | 219/10.51 |
| 2,926,297 | 2/1960 | Humber et al. | 322/33 |
| 3,450,977 | 6/1969 | Krauss | 322/33 |
| 3,804,968 | 4/1974 | Mosser | 219/10.49 R |
| 3,821,508 | 6/1974 | Hagerty | 219/10.49 |
| 3,974,395 | 8/1976 | Bright | 290/44 |
| 4,059,771 | 11/1977 | Jacobs et al. | 290/44 |
| 4,095,120 | 6/1978 | Moran et al. | 290/44 |
| 4,112,311 | 9/1978 | Theyse | 290/44 |
| 4,146,264 | 3/1979 | Korzeniewski | 290/44 |
| 4,150,300 | 4/1979 | Van Winkle | 290/44 X |
| 4,160,170 | 7/1979 | Harner et al. | 290/44 |
| 4,217,475 | 8/1980 | Hagerty | 219/10.51 |
| 4,236,083 | 11/1980 | Kenney | 290/55 |
| 4,238,337 | 12/1980 | Peters et al. | 219/10.49 R X |
| 4,242,628 | 12/1980 | Mohan et al. | 322/35 |
| 4,316,096 | 2/1982 | Syverson | 290/44 |

Primary Examiner—B. A. Reynolds
Assistant Examiner—Philip H. Leung
Attorney, Agent, or Firm—Kinney, Lange, Braddock, Westman and Fairbairn

[57] ABSTRACT

A windmill electric heater converts wind energy to heat energy. A windmill drives a rotor of an eddy current heater. Magnetic fields are provided at an air gap between the rotor and a stator of the eddy current heater. Rotation of the rotor with respect to the stator causes eddy currents, and therefore heat, to be generated in the rotor. The heat generated in the rotor is drawn off for beneficial use such as in heating a house or other building. Excitation of the magnetic fields (and therefore the amount of heat generated) is controlled as a function of sensed parameters such as wind velocity, ambient temperature of the surroundings to be heated and temperature of the eddy current heater.

4 Claims, 6 Drawing Figures

U.S. Patent    Dec. 20, 1983    Sheet 1 of 2    4,421,967
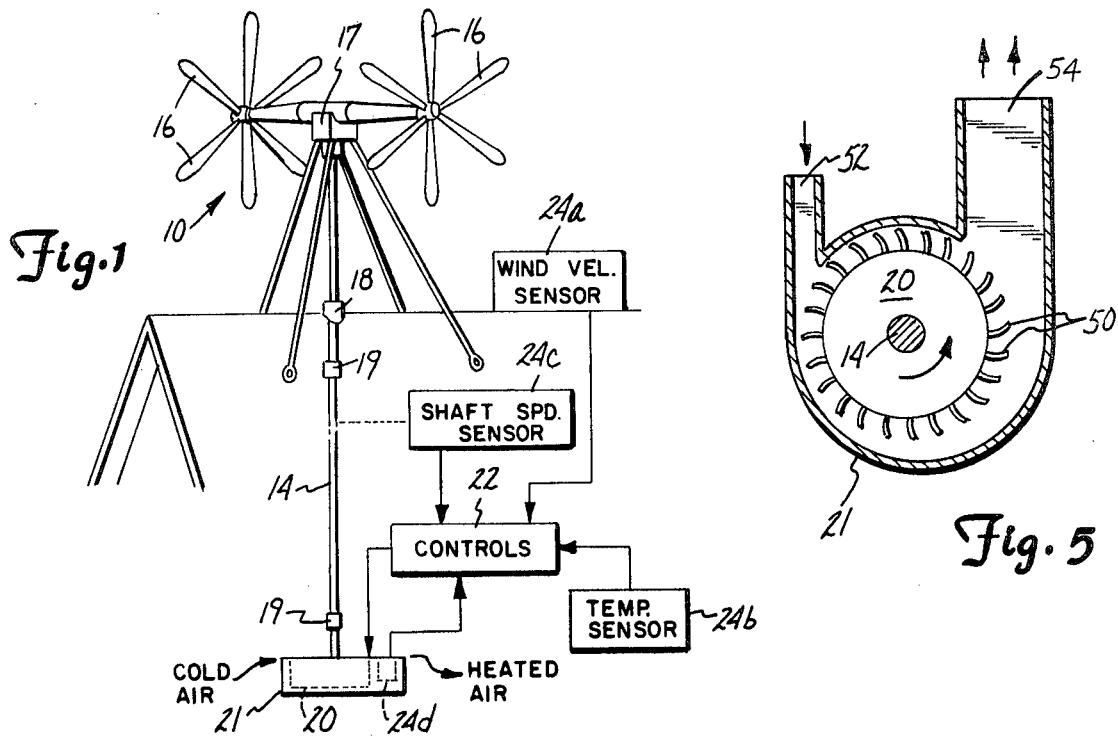
Fig. 1
Fig. 5
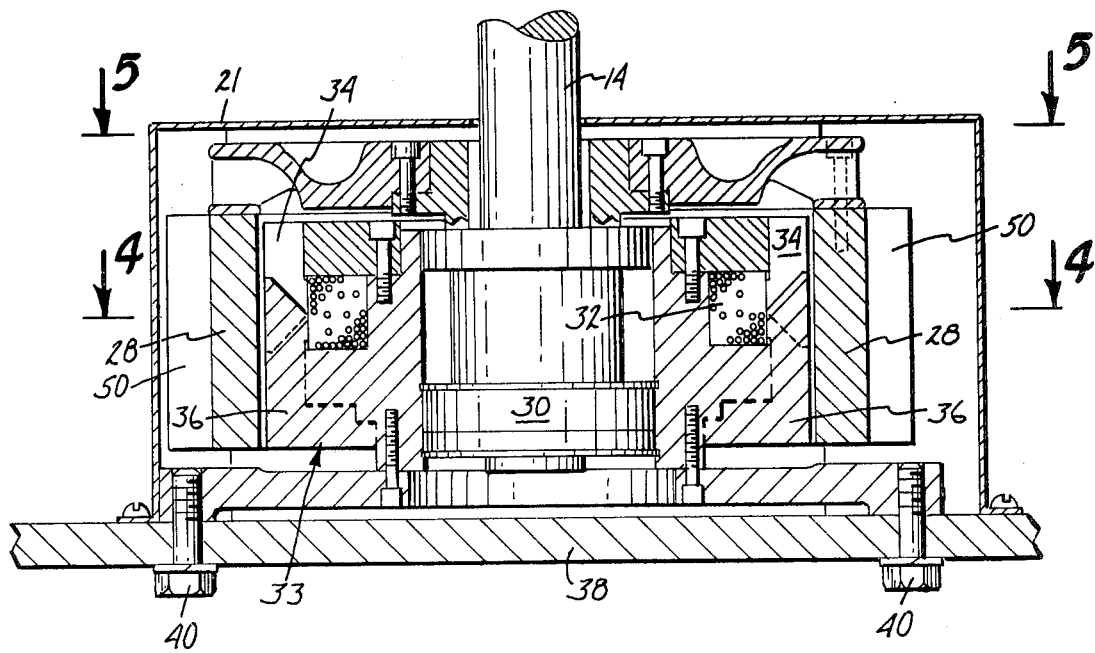
Fig. 2

WINDMILL DRIVEN EDDY CURRENT HEATER

This is a continuation of application Ser. No. 170,736, filed July 21, 1980 now abandoned.

BACKGROUND OF THE INVENTION

1. Field of the Invention

The present invention relates generally to heating devices and more specifically to windmill heaters.

2. Description of the Prior Art

The principle of using a windmill to convert wind energy into some form of useful work is old. Windmills have been used to mill grain, to drive water pumps, to drive electric generators and alternators, to drive turbines and the like.

SUMMARY OF THE INVENTION

The present invention provides a means and source of heat directly from the rotation of a windmill drive shaft.

In the present invention, a windmill has a drive shaft which is coupled to an eddy current heater. The eddy current heater includes a rotor coupled to the drive shaft, a stator, and means for exciting magnetic fields between the rotor and stator. As the drive shaft rotates the rotor with respect to the stator, eddy currents (and therefore heat) are generated as a function of the magnetic flux density and the relative speed between the rotor and the stator.

In a preferred embodiment, the means for exciting magnetic fields includes coils for generation of magnetic fields between the rotor and stator, and means for supplying electrical current to the coils to generate the magnetic fields. The means for supplying electrical current supplies the current (and thereby controls the amount of heat generated) as a function of sensed parameters. These sensed parameters preferably include wind velocity and ambient temperature of the surroundings to be heated.

BRIEF DESCRIPTION OF THE DRAWINGS

FIG. 1 is a partially schematic representation of the windmill heater of the present invention showing a windmill with a drive shaft coupled to an eddy current heater.

FIG. 2 is a sectional view of the eddy current heater.

FIG. 5 is a sectional view along line 5—5 of FIG. 2.

DETAILED DESCRIPTION OF THE PREFERRED EMBODIMENTS

Figure 3:
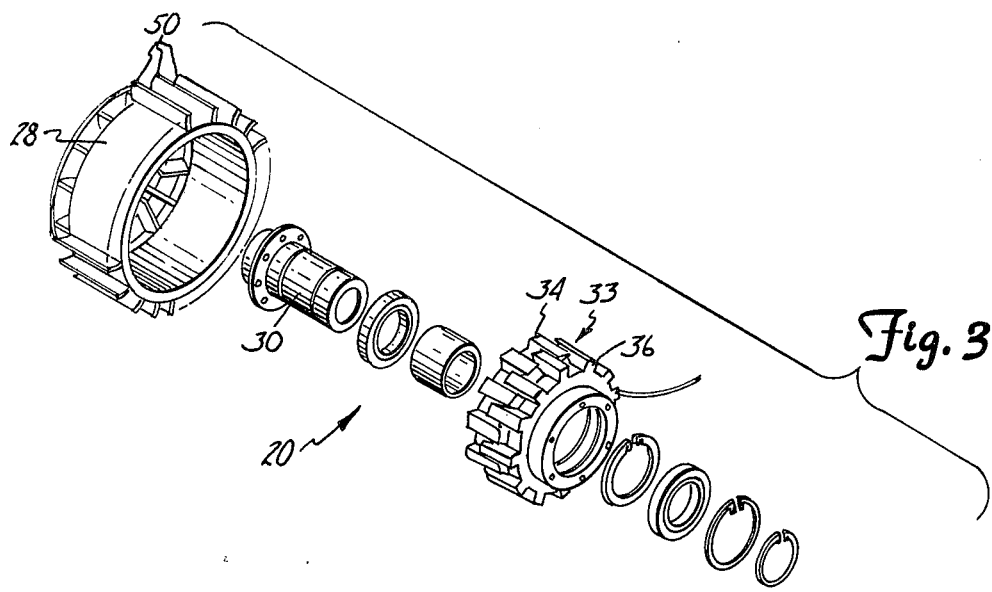
FIG. 3 is an exploded view of the eddy current heater.
Figure 4:
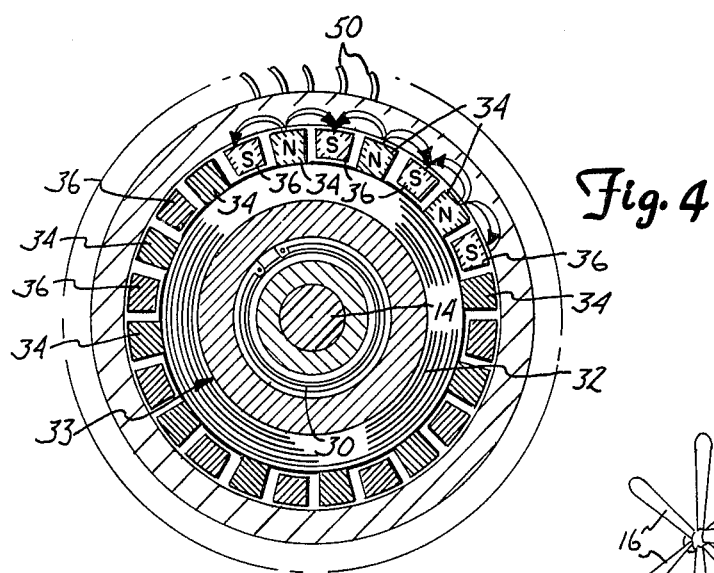
FIG. 4 is a partially schematic representation of a section of the eddy current heater taken along line 4—4 of FIG. 3.

FIG. 1 shows a preferred embodiment of the windmill electric heater of the present invention. Windmill 10 is mounted on the roof of building 12, the interior of which is to be heated. Windmill 10 provides rotation of drive shaft 14 as the wind moves past windmill propellers 16. Although the specific embodiment of windmill 10 illustrated has a pair of propellers 16, other windmill designs are applicable to the present invention so long as they convert wind movement into rotational movement of drive shaft 14.

Drive shaft 14 extends downward from gear box 17 of windmill 10, through seal 18, and into house 12. Bearings 19 and a bearing within seal 18 permit rotation of drive shaft 14. Drive shaft 14 is connected to and drives eddy current heater 20, which is mounted within heat exchanger housing 21.

Electrical current is supplied to eddy current heater 20 by electrical control 22 to excite magnet flux inducing coils of eddy current heater 20. Controls 22 preferably control the current to eddy current heater 20 as a function of sensed parameters such as wind velocity, ambient room temperature, the speed of shaft 14, and temperature within housing 21. In the embodiment shown in FIG. 1, wind velocity sensor 24a senses wind velocity, temperature sensor 24b senses ambient room temperature, shaft speed sensor 24c senses the speed of rotation of shaft 14, and temperature sensor 24d senses temperature within housing 21. It should be recognized, however, that other parameters may be sensed to provide inputs to control 22. Similarly, not all of the parameters discussed above need be sensed for certain systems. In that case, not all of the sensors shown in FIG. 1 are necessary. For example, in some successful embodiments, only wind velocity sensor 24a and temperature sensor 24b are provided. Control 22 preferably includes a microcomputer, a current driver, and necessary interface circuitry for receiving the signals from sensors 24a–24d.

Eddy current heater 20 is shown in further detail in FIGS. 2–5. In the embodiments shown in FIGS. 2–5, eddy current heater 20 is a device which is presently utilized as an eddy current brake manufactured by Stromag Incorporated, 95 Compark Road, Centerville, Ohio, 45459. In the present invention, however, eddy current heater 20 is being used to generate heat, not as a braking device for stopping rotation of a shaft.

FIG. 2 is a cross-sectional view of the eddy current heater 20 mounted in heat exchanger housing 21. Eddy current heater 20 includes rotor 28, bearing 30, magnetic field coils 32, and a stator 33 formed by north pole pieces 34, and south pole pieces 36. Rotor 28 is directly coupled to drive shaft 14 and rotates about stator 33, which is fixedly mounted to base 38 by mounting bolts 40. Magnetic coils 32 are mounted on stator 33 between pole pieces 34 and 36 and are electrically connected to control 22. The DC electrical current from control 22 to field coils 32 generates a magnetic flux in ferromagnetic pole pieces 34 and 36, which are alternately spaced about the circumference of stator 33, as can be better seen by reference to FIGS. 3 and 4.

FIG. 3 is an exploded view of an eddy current heater 20. Mounted on bearing 30 are round field coil 32 (not visible in FIG. 3) and pole pieces 34 and 36 which enclose coil 32. When coil 32 is energized, pole piece 34 becomes the north pole and pole piece 36 becomes the south pole. The outermost portions of pole pieces 34 and 36 are alternately arranged about the circumference of stator 33. Magnetic flux lines flow from outer portions of north pole piece 34, across the narrow air gap between the rotor 28 and stator 33, through rotor 28 and back again to south pole piece 36. Flux flows this direction because the air gap is relatively small compared to the distance between the pole pieces and consequently most of the flux will flow through rotor 28 going from north to south pole. This is the path of least resistance. The rotation of rotor 28 through this magnetic flux path causes the generation of eddy currents in the electrically conductive material of rotor 28 to create a force or torque opposing rotation. The amount of excitation of field coil 32 determines the amount of flux, and the amount of eddy currents induced in rotor 28 is a function of the relative speed of the rotor 28 to the stator 30 as well as the amount of excitation. The driving of rotor 28 against the resistive torque created by the magnetic flux does work, which is manifested in the form of heat caused by the eddy currents in the rotor 28.

The horse power output (HP) of eddy current heater 20 is given by the following relationship:

$$HP = \frac{T(LB - FT) \times N(RPM)}{5252}$$

Where: T=torque resulting from magnetic coupling across the air gap between the rotor and stator; N=relative speed between rotor 28 and stator 33.

If windmill 10 (or another mechanical source of power such as a water wheel or other prime mover) produces a torque of 100 foot pounds at a shaft speed of 250 RPM when a proper excitation is applied to field coils 32, the hose power input to eddy current heater 20 is:

$$HP = \frac{100 \times 250}{5252} = 4.76 \text{ HP}$$

The values selected in this example are typical from a windmill in about a 20 mph wind. Since stator 33 is secured to base 38 by mounting bolts 40 and cannot rotate, the mechanical energy output of eddy current heater 20 is zero. Thus all of the 4.76 HP input power is converted to heat by eddy current heater 20. In this example, the BTUs per hour of eddy current heater 20 is determined by dividing the input horse power (4.76 HP) by $3.928 \times 10^{-4}$. In other words, the BTU per hour generated by eddy current heater 20 in this example is $1.2118 \times 10^4$.

Control 22 controls the drive current to field coil 32 to provide the desired heat output for given wind velocity and a desired output termperature. By adjusting the drive current, control 22 can maintain the same heat output with varying wind velocity, and can vary the heat output even when the wind velocity remains the same.

In general, control 22 maintains the current to field coils 32 at a level which permits rotation of shaft 14. If, of course, the drive current to field coils 32 becomes too high, the magnetic coupling between rotor 28 and stator 33 can become so strong that the amount of torque necessary to rotate rotor 28 is more than available from windmill 10. The heat output of eddy current heater 20 is a function of the amount of excitation and the relative speed of rotor 28 and stator 33. As the drive current to field coils 32 is increased, the magnetic coupling increases, and thus the torque increases. For a given windmill, a torque/speed curve as a function of wind velocity can be determined. With this torque/speed curve and with the input signal from velocity sensor 24a, control 22 selects the proper drive current to field coils 32 so that the desired heat output is achieved without overloading the capability of the windmill.

FIG. 5 shows eddy current heater 20 mounted on the interior throat section of heat exchanger housing 21. The drive shaft 14 drives the rotor 28 in a counterclockwise direction. Mounted on the side exterior of rotor 28 are heat exchanger fins 50, marginally curved in the direction of rotation. Heat exchanger fins 50 upon rotation act to draw cool air in from the inlet port 52 and drive heated air out outlet port 54. The passage of air over heat exchanger fins 50 and rotor 28, which are being heated by eddy currents, acts to heat the air before it is forced out through outlet port 54.

In other embodiments of the present invention, a separate fan is provided to circulate air through heat exchanger housing 21 past eddy current heater 20.

Figure 6:
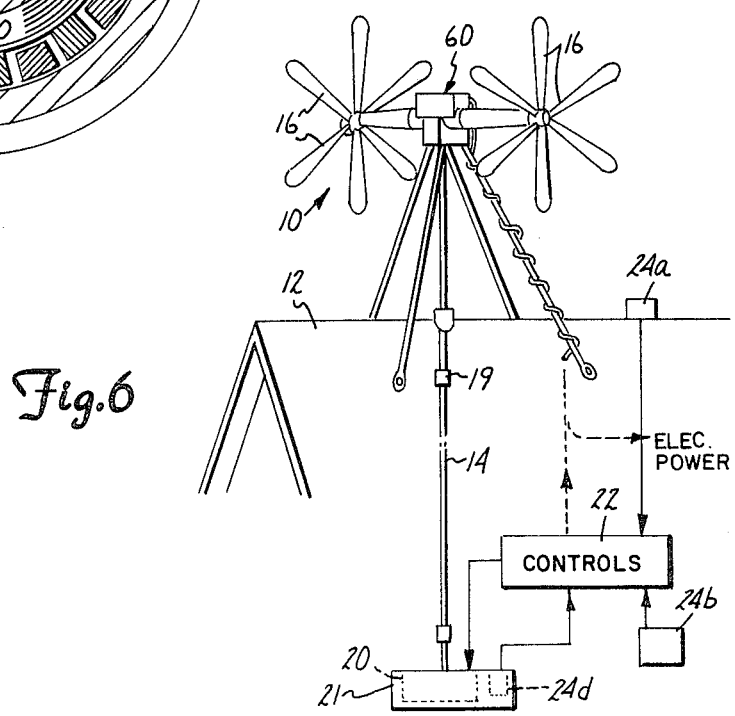
FIG. 6 is a partially schematic representation of another embodiment of the present invention.

FIG. 6 shows another embodiment of the present invention which is generally similar to the embodiments shown in FIG. 1. For that reason, similar reference numbers are used to designate similar elements. The embodiment shown in FIG. 6, however, further includes an electric generator 60 mounted between windmill props 16. Electric generator 60 provides electrical power for use in house 12. Control 22 provides excitation for both eddy current heater 20 and electric generator 60. For any given shaft power from windmill props 16, excitation to both eddy current heater 20 and electric generator 60 is controlled by control 22 to provide the desired use of the shaft power in converting to either heat or electrical energy. In the summer, energy needs are primarily electrical, and control 22 provides the appropriate excitation to electric generator 60 and in some cases no excitation to eddy current heater 20. In winter, control 22 provides excitation to generator 60 and heater 20 so that some or all of the shaft power is used to provide heat.

The heater of the present invention provides high efficiencies in conversion of energy to heat. Except for frictional losses in bearings 19, nearly all the shaft power is converted to heat by eddy current heater 20. Control 22 provides the necessary excitation to the field coils of eddy current heater 20 so that the desired heat output is achieved for a particular wind velocity.

Although the present invention has specifically been directed to windmill drive of eddy current heater 20, other sources of rotational mechanical energy may also be used in accordance with the present invention. For example, shaft 14 may, in some embodiments, be coupled to a water wheel or other prime mover.

Although the present invention has been described with reference to preferred embodiments, workers skilled in the art will recognize that changes may be made in form and detail without departing from the spirit and scope of the invention.

What is claimed is:

1. An apparatus for converting wind energy to heat, comprising:
   windmill means for rotating a shaft in response to wind movement;
   eddy current heater means having an inner stator fixedly mounted and an electrically conductive metal outer rotor which at least partially surrounds the inner stator and has an inner surface which is spaced from an outer circumference of the stator by a narrow air gap which is connected to and driven by the shaft and which is rotatably mounted in relation to the inner stator, a plurality of north and south ferromagnetic pole pieces alternately spaced and supported about the circumference of the stator, and magnetic field coil means mounted on the inner stator between the pole pieces for generating, as a function of a variable electrical excitation current, magnetic flux lines which pass from the north pole pieces across the air gap through the outer member and across the air gap to adjacent south pole pieces to induce eddy currents in the outer rotor which create a torque opposing rotation of the outer rotor and which thereby generate heat in the outer rotor as the outer rotor rotates relative to the inner stator due to rotation of the shaft, the heat generated in the outer rotor being a function of the torque opposing rotation and relative speed of the outer rotor with respect to the inner stator, and wherein the torque opposing rotation is a function of magnetic coupling between the outer rotor and the inner stator across the air gap produced by the magnetic flux lines;

first sensing means for sensing wind velocity and providing a first electrical signal indicative thereof;

second sensing means for sensing ambient room temperaure of an area heated by heat derived from the outer rotor and providing a second electrical signal which is a function of the sensed ambient room temperature;

control means for providing the variable electrical excitation current to the magnetic field coil means to control the magnetic coupling between the outer rotor and the inner stator as a function of (a) the first electrical signal, (b) the second electrical signal and (c) a predetermined torque speed curve as a function of wind velocity for the windmill means so that the eddy current heater means generates a desired heat output; and means for drawing air past an outer surface of the outer rotor to derive heat from the eddy current heater means.

2. The apparatus of claim 1 and further comprising:

third sensing means for sensing rotation velocity of the shaft and providing a third electrical signal indicative thereof; and wherein the control means controls the magnetic coupling as a function of (d) the third electrical signal from the third sensing means.

3. The apparatus of claim 1 and further comprising:

electrical generating means for generating electricity in response to rotation of the shaft; and wherein the control means provides excitation to the electrical generating means to control relative amounts of heat output of the eddy current heater means and electrical output of the electrical generating means.

4. An apparatus for generating heat comprising:

windmill means for rotating a shaft in response to wind movement;

an eddy current heater having a rotor member and a stator member, the rotor being connected to the shaft to rotate with respect to the stator;

means for generating magnetic flux lines as a function of a variable electrical excitation current, between the rotor and stator to induce heat producing eddy currents in one of the members, which create a torque opposing rotation of the rotor, wherein the heat produced is a function of the torque opposing rotation and speed of rotation of the rotor relative to the stator and wherein the torque opposing rotation is a function of magnetic coupling between the rotor and stator produced by the magnetic flux lines;

means for sensing wind velocity;

means for sensing ambient room temperature of an area heated by heat derived from the eddy current heater;

means for supplying the variable electrical excitation current to control the magnetic coupling as a function of (a) the sensed wind velocity, (b) the sensed temperature and (c) a predetermined torque/speed curve as a function of wind velocity for the windmill means to cause the eddy current heater to produce a desired heat output; and means for deriving heat from the eddy current heater.

* * * * *